United States Patent
Meierhoefer et al.

(10) Patent No.: US 12,333,484 B1
(45) Date of Patent: Jun. 17, 2025

(54) SECURE ACCESS TO CONTROLLED INVENTORY PROFILES

(71) Applicant: comScore, Inc., Reston, VA (US)

(72) Inventors: Cameron S. Meierhoefer, Washington, DC (US); Michael A. Brown, Ashburn, VA (US); Brian Pugh, Reston, VA (US)

(73) Assignee: comScore, Inc., Reston, VA (US)

(*) Notice: Subject to any disclaimer, the term of this patent is extended or adjusted under 35 U.S.C. 154(b) by 0 days.

(21) Appl. No.: 14/632,566

(22) Filed: Feb. 26, 2015

(51) Int. Cl.
*G06Q 10/087* (2023.01)
*H04L 9/08* (2006.01)

(52) U.S. Cl.
CPC ......... *G06Q 10/087* (2013.01); *H04L 9/0861* (2013.01); *G06Q 2220/10* (2013.01)

(58) Field of Classification Search
CPC .................................................. G06Q 20/203
See application file for complete search history.

(56) References Cited

U.S. PATENT DOCUMENTS

| | | | | |
|---|---|---|---|---|
| 7,065,787 B2* | 6/2006 | Ganesan | ................. | G06F 21/10 726/21 |
| 7,191,244 B2* | 3/2007 | Jennings | ............... | H04L 65/613 709/231 |
| 7,644,400 B2* | 1/2010 | Harris | ..................... | H04L 67/02 717/136 |
| 8,200,775 B2* | 6/2012 | Moore | .................... | H04L 63/20 709/217 |
| 8,464,206 B2* | 6/2013 | Jenkins | .................. | G06F 16/93 717/136 |

(Continued)

FOREIGN PATENT DOCUMENTS

| | | | | |
|---|---|---|---|---|
| WO | WO-9627155 A2 | * | 9/1996 | ............. G06F 21/00 |
| WO | WO-03040893 A2 | * | 5/2003 | ............. G06Q 50/10 |
| WO | WO-2013126467 A1 | * | 8/2013 | ........... G06F 16/248 |

OTHER PUBLICATIONS

Payments Security Taskforce. "U.S. Payments Security Evolution and Strategic Road Map ." (2014). Retrieved online Apr. 22, 2025. https://www.mastercard.com/content/dam/public/mastercardcom/globalrisk/pdf/US-Payments-Security-Evolution-and-Strategic-Road-Map-for-Release.pdf (Year: 2014).*

(Continued)

*Primary Examiner* — James A Reagan
(74) *Attorney, Agent, or Firm* — Blank Rome LLP (57) ABSTRACT

Methods, systems, and apparatus, including computer programs encoded on computer storage media, for providing secure and trusted access to information regarding online inventory and for providing publishers control over the type and amount of information provided regarding the online inventory are disclosed. One aspect includes receiving a request to generate a secure token related to online inventory and obtaining an identifier associated with the content associated with the online inventory based at least in part on a URL included in the received request. The obtained identifier is combined with other information associated with the content associated with the online inventory. A secure token is generated by applying one or more security features to the combination of the obtained identifier and the other information associated with the content associated with the online inventory.

16 Claims, 4 Drawing Sheets

(56) References Cited

U.S. PATENT DOCUMENTS

| | | | | |
|---|---|---|---|---|
| 8,659,389 | B2* | 2/2014 | Nasser | H04Q 9/00 705/28 |
| 8,812,647 | B1* | 8/2014 | Jain | G06Q 30/0273 709/223 |
| 9,323,916 | B1* | 4/2016 | Wu | H04L 63/126 |
| 9,576,032 | B2* | 2/2017 | Wolf | G06F 16/972 |
| 9,819,648 | B1* | 11/2017 | Chilakapati | H04L 63/10 |
| 2002/0099842 | A1* | 7/2002 | Jennings | H04L 47/70 709/231 |
| 2005/0038996 | A1* | 2/2005 | Meyerson | G06F 21/6218 713/165 |
| 2005/0267872 | A1* | 12/2005 | Galai | G06F 16/951 |
| 2006/0173985 | A1* | 8/2006 | Moore | H04L 67/00 707/E17.116 |
| 2006/0294192 | A1* | 12/2006 | Mao | H04L 63/102 709/213 |
| 2007/0087756 | A1* | 4/2007 | Hoffberg | G06Q 10/06375 455/450 |
| 2008/0077568 | A1* | 3/2008 | Ott | G06F 16/951 707/999.005 |
| 2009/0006469 | A1* | 1/2009 | Jain | G06Q 30/02 707/E17.046 |
| 2009/0249446 | A1* | 10/2009 | Jenkins | G06Q 10/063 707/E17.108 |
| 2009/0259940 | A1* | 10/2009 | Moraes | H04L 67/025 717/100 |
| 2010/0148934 | A1* | 6/2010 | Nasser | H04Q 9/00 340/10.6 |
| 2010/0192210 | A1* | 7/2010 | Purdy, Sr. | G06Q 20/1235 726/7 |
| 2012/0311688 | A1* | 12/2012 | Lemus | G06F 21/33 726/8 |
| 2013/0226907 | A1* | 8/2013 | Wolf | G06F 16/951 707/722 |
| 2013/0238890 | A1* | 9/2013 | Pieper | H04L 67/20 713/150 |
| 2014/0052822 | A1* | 2/2014 | Rodriguez Rodriguez | H04L 67/568 709/218 |
| 2014/0208203 | A1* | 7/2014 | Tang | G06F 40/106 715/252 |
| 2014/0215059 | A1* | 7/2014 | Astiz Lezaun | H04L 67/1008 709/224 |
| 2015/0067341 | A1* | 3/2015 | Deen | H04L 63/123 713/176 |
| 2015/0112790 | A1* | 4/2015 | Wolinsky | G06Q 20/20 705/14.38 |
| 2016/0036848 | A1* | 2/2016 | Reddy | H04L 61/1511 726/22 |
| 2016/0065635 | A1* | 3/2016 | Besehanic | H04L 65/762 709/224 |

OTHER PUBLICATIONS

Matt Bishop. "Introduction to Computer Security." (2005). Retrieved online Apr. 22, 2025. https://www.uoitc.edu.iq/images/documents/informatics-institute/exam_materials/Introduction%20to%20Computer%20Security%20pdf%20DONE.pdf (Year: 2005).*

FCC. "Cyber Security Planning Guide." (2006). Retrieved online Apr. 22, 2025. https://www.fcc.gov/sites/default/files/cyberplanner.pdf (Year: 2006).*

* cited by examiner

402 — Example Request Sent To Secure Token API:
{
https://progapi.comscore.com/geturl?url=http&3A%2F%2Ffashion.blogs.news.com%2F%3Faction%3Dclick%26region%3DTopBar%26pgtype%3DSectionFront%26module%3DSectionsNav%26version%3DBrowseTree%26contentCollection%3DFashion%2520%2526%2520Style%252F0n%2520the%2520Runway%26contentPlacement%3D2%26t%3Dqry560&custID=1234&clientID=A678
}

404 — Example Response From Secure Token API:
{
"URL":
"http://fashion.blogs.news.com/?action=click&region=TopBar&pgtype=SectionFront&module=SectionsNav&version=BrowseTree&contentCollection=Fashion%20%26%20Style%2FOn%20the%20Runway&contentPlacement=2&t=qry560"
"Result": {
   "TrustID":"16023805",
   "Category":"Lifestyles",
   "SubCategory":"Beauty/Fashion/Style",
   "PopulationData":
   {
      "Population":"CA",
      "MMxRank":3,
      "VMxRank":3,
      "CategoryRank":1,
      "SubCategoryRank":1,
      "Viewability":2,
      "NHT":1
   },
   {
      "Population":"US",
      "MMxRank":2,
      "VMxRank":3,
      "CategoryRank":1,
      "SubCategoryRank":1,
      "Viewability":1,
      "NHT":1
   }
}

FIG. 4

SECURE ACCESS TO CONTROLLED INVENTORY PROFILES

BACKGROUND

Online inventory (e.g., advertisement opportunities on webpages) may be sold through a number of different channels. For example, online inventory can be sold via "direct" sales, similar to the manner in which inventory may be sold in traditional media (e.g., print, radio, television, etc.). In another example, online inventory can be sold via programmatic sales systems (e.g., real-time bidding exchanges). Regardless of the channel of sale, all parties involved in the sale of online inventory seek to increase the efficiency and accuracy of pricing.

SUMMARY

The present disclosure relates to methods and systems for providing secure and trusted access to information regarding online inventory and for providing publishers control over the type and amount of information provided regarding the online inventory. In one implementation, a method includes receiving a request to generate a secure token related to online inventory, the request being received from a first computer system and including a uniform resource locator (URL) for content associated with the online inventory. An identifier associated with the content associated with the online inventory is obtained based at least in part on the URL included in the received request. The obtained identifier is combined with other information associated with the content associated with the online inventory. A secure token is generated by applying one or more security features to the combination of the obtained identifier and the other information associated with the content associated with the online inventory. The request is responded to with the generated secure token. A request is received, from a second computer system, for information that includes the generated secure token. The received request is responded to with information describing attributes associated with the content associated with the online inventory, the information comprising at least one ranking of the content associated with the online inventory with regard to other content.

Other implementations of these aspects include corresponding computer programs recorded on one or more computer storage devices, each configured to perform the actions of the methods. One or more of the each component described above can be configured to perform particular operations or actions. One or more software programs can be configured to perform particular operations or actions by virtue of including instructions that, when executed by a data processing apparatus, cause the system to perform the actions.

These implementations may include one or more of the following features. For example, obtaining the identifier associated with the content associated with the online inventory may include: comparing at least a portion of the URL included in the received request with entries in a content dictionary; based on the comparison of at least a portion of the URL included in the received request with the content dictionary, determining a mapping key that associates the content associated with the online inventory with categorization information about the content; and/or generating the identifier associated with the content in which the online inventory by obfuscating the determined mapping key.

Additionally or alternatively, combining the obtained identifier with other information associated with the content associated with the online inventory may include combining the obtained identifier with at least one of: (1) a timestamp, (2) a secret code, and (3) information about a client system from which a request for the content associated with the online inventory has been received by the first computer system. Additionally or alternatively, generating the secure token by applying one or more security features to the combination of the obtained identifier with other information associated with the content associated with the online inventory may include applying a reversible encryption algorithm to the combination of the obtained identifier with other information associated with the content associated with the online inventory.

Additionally or alternatively, the method may further include applying a decryption algorithm to the secure token included in the request for information received from the second computer system in order to retrieve the identifier associated with the content associated with the online inventory; and/or obtaining, using the retrieved identifier, the at least one ranking of the content associated with the online inventory. Additionally or alternatively, responding to the received request with information describing attributes associated with the content associated with the online inventory comprises responding to the received request with the other information associated with the content associated with the online inventory with which the obtained identifier is combined.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Online content publishers and purchasers of online inventory (e.g., advertisers) rely on online analytics entities to provide trusted information about a publisher's content. For example, online analytics entities that are separate from entities selling inventory may provide unbiased measurement information about the audience that views or otherwise interacts with a publisher's content and, relatedly, its advertisement inventory. These online analytics entities may rely upon a number of different methods for collecting measurement information regarding publisher's content, including, for example, the maintenance of large panels of online users who volunteer to provide detailed demographic and behavioral data to the online analytics entity and/or the collection of census data (e.g, through the use of "beaconing," proxy redirection, and/or access to server logs).

Online analytics entities use collected audience measurement information to develop various metrics and statistics that online content publishers and purchasers of online inventory can use to value the publishers' online inventory. For example, an online analytics entity may rank publishers' content within various categories, such as the theme of the content (e.g., sports, cooking, investing, etc.). Additionally or alternatively, an online analytics entity may rank publishers' content according to the demographic information of its audience (e.g., males aged 18 to 35). Additionally or alternatively, an online analytics entity may simply provide general audience consumption and behavior information for publisher's content (e.g., total number of visitors to a publisher's content per month, average time spent per visitor viewing a publisher's content, visitor interaction rate for filled inventory, etc.).

Depending on its sources, an online analytics entity may be able to provide varying levels of granularity in its measurements for both the content itself and the audience for the content. For example, an online analytics entity may be able to provide information about a publisher's top-level domain(s) (e.g., "news.com"), as well as various levels of sub-domains and directories (e.g., "sports.news.com," "sports.news.com/baseball," etc.). An online analytics entity may further employ various categories for characterizing the content within these domains and sub-domains. For example, the domain "news.com" may be categorized as "News—General," the sub-domain "sports.news.com" may be categorized as "News—Sports," and the sub-domain directory "sports.news.com/baseball" may be categorized as "News—Sports—Baseball." Based on these categorizations, an online analytics entity may determine and provide metrics for a publisher's domains, sub-domains, and/or directories including, for example, rankings of audience traffic to a publisher's content within a particular domain, sub-domain, or directory in comparison to other publisher's content within the same or similar categories.

There may be various methods an online analytics entity may provide to publishers and/or purchasers of online inventory to access the online analytics entity's trusted information. For example, an online analytics entity may publish reports of various formats that may then be provided (e.g., by purchase) to publishers and/or advertisers. However, in a case where a publisher obtains a report from an online analytics entity and desires to rely upon the data in that report to sell online inventory, a purchaser of the online inventory may desire to validate the data with the online analytics entity before relying on the data for its purchasing decision. For example, the publisher that owns and operates news.com may obtain a report from an online analytics entity that indicates news.com ranks number one amongst females aged 45 to 57 in comparison to all content available within the "News—General" category. In determining a price for advertisement inventory associated with news.com, the publisher may wish to provide a purchaser with the ranking information included in the report as part of negotiating price, quantity, or other details regarding the sale of the advertisement inventory. However, before relying on the ranking information provided by the publisher, a purchaser of online inventory would want a method of validating with the online analytics entity that the ranking information is authentic and accurate.

The process of providing and validating information attributed to an online analytics entity may become more complicated in the case of programmatic sales. For example, real-time bidding exchanges that auction online inventory on a per-impression basis at the time of content provision may need to obtain and validate metrics or statistics in a very short period of time in order for the information to be useful without slowing down the auction process. Additionally, there may be instances in which a publisher wants to programmatically sell certain online inventory without divulging the publisher's exact identity. For example, the publisher of news.com may not be able to sell all of its online inventory through direct sales channels, so it may choose to use programmatic sales channels to sell its remaining inventory. However, in order to avoid undermining other sales channels (which may, for example, be able to sell online inventory at a higher price), the publisher of news.com may wish to sell online inventory through programmatic sales channels without directly indicating that the online inventory is associated with news.com. Unfortunately, a completely blind sale of online inventory will cause the inventory to be indistinguishable from any other online inventory that may be available at the same time, and thus may result in a substantial undervaluing of otherwise valuable online inventory. Accordingly, publishers interested in selling through programmatic sales channels online inventory associated with highly rated/ranked content would benefit from the ability to indicate the high rating/ranking of the content to a purchaser without needing to divulge the exact identity of the publisher. Additionally, purchasers of online inventory would benefit from the ability to quickly verify the information provided by these otherwise anonymous publishers and know that the information comes from an unbiased and trusted source. For example, the information provided by an online analytics entity about a publisher's online inventory may be used to more efficiently price the online inventory, such that publishers with higher rated/ranked content may receive higher bids and, ultimately, sales prices because purchasers have a trustworthy source of information about the online inventory.

This disclosure presents methods and systems by which an online analytics entity may furnish trusted information about a publisher's online inventory to the various parties involved in the sales of the online inventory. The methods and systems described herein may provide a security measure that prevents misappropriated or otherwise false data from being attributed to the online analytics entity. Moreover, the methods and systems described herein may provide a publisher with control over the type and amount of information about its online inventory that may be provided to third parties.

As an example, some of the methods and systems described herein provide an online analytics entity with a mechanism for generating a secured token that anonymously identifies a publisher's content and/or online inventory and mechanisms for exchanging the secured token. The secured token may be exchanged between publishers and any third parties (e.g., parties involved in the sale of online inventory, audience members, other publishers, etc.). When a third party sends the secured token to the online analytics entity, the online analytics entity provides a profile of information about the publisher's content and/or online inventory associated with the secured token. In some implementations, the publisher can control the type and amount of information contained in the profile, but the online analytics entity ensures the accuracy of the included information. The secured tokens may be generated with various security features, so as, for example, to ensure the authenticity of their use.

Figure 1:
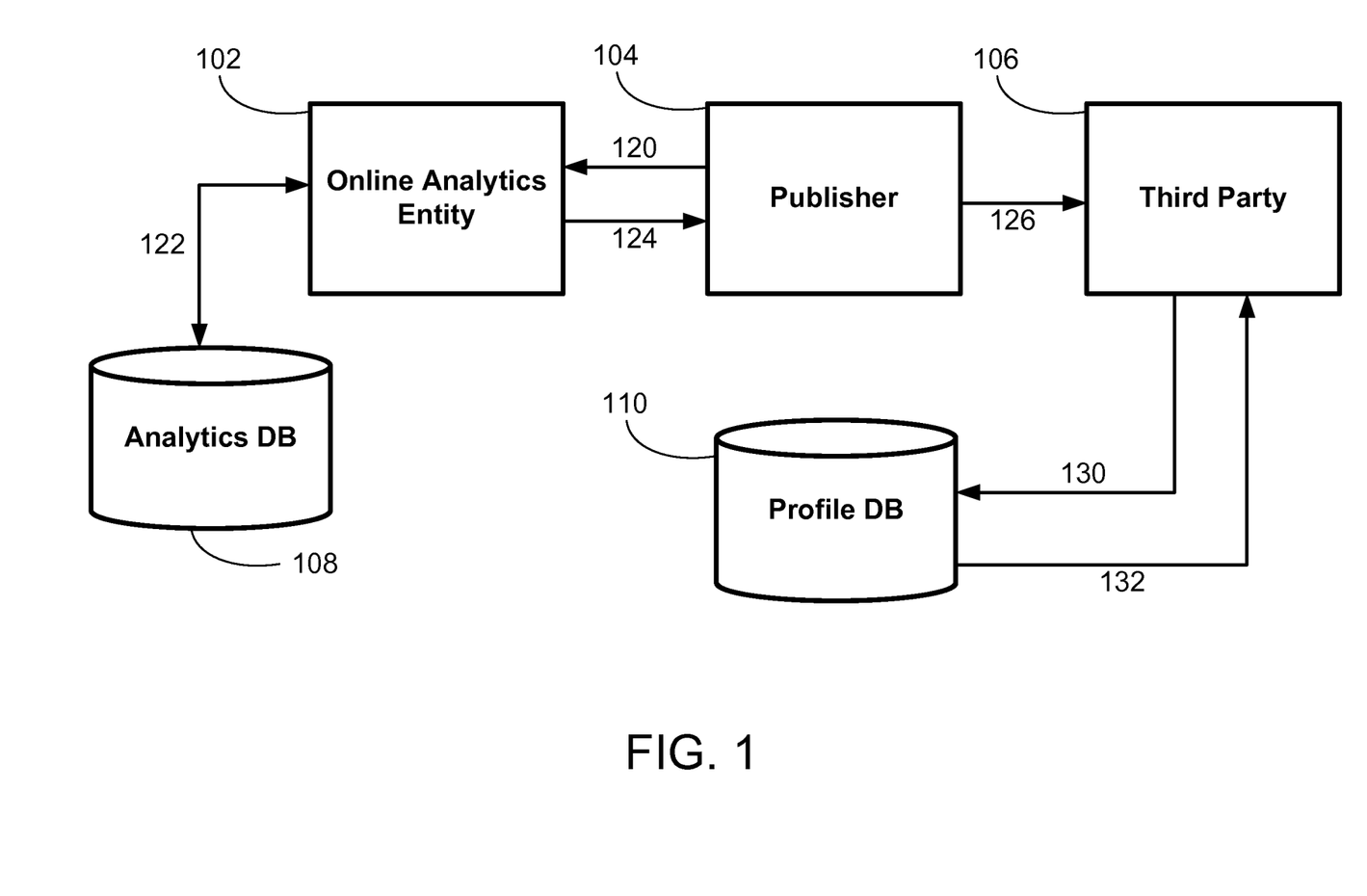
FIG. 1 is a block diagram illustrating an example system for providing secure and trusted access to information regarding online inventory according to one implementation.

FIG. 1 is a block diagram illustrating an example of a system 100 for providing secure and trusted access to information regarding online inventory according to one implementation. In particular, system 100 includes an online analytics entity 102, a publisher 104, a third party 106, analytics database 108, and a profile database 110. The online analytics entity 102, the publisher 104, and the third party 106 may each include one or more computer systems. For example, the online analytics entity 102, the publisher 104, and the third party 106 may include one or more general-purpose computers capable of responding to and executing instructions in a defined manner, one or more personal computers, one or more special-purpose computers, one or more workstations, one or more servers, and/or one or more mobile devices. In some implementations, the one or more computer systems included in the online analytics entity 102, the publisher 104, and the third party 106 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a computer system.

The online analytics entity 102 may be an entity that provides information about publisher's content and/or online inventory (e.g., ratings, rankings, reviews, etc.). As described above, the online analytics entity 102 may collect, analyze, and/or maintain information about the publisher's content and/or online inventory in various manners. For example, the online analytics entity 102 may leverage a panel of online audience members who's demographic and behavior data may be projected to a larger population. Additionally or alternatively, the online analytics entity 102 may collect, analyze, and/or maintain publisher-side traffic data (e.g., beacon data, server-side statistics, cookie data, etc.). Additionally or alternatively, the online analytics entity 102 may obtain data from third parties and/or data partners (e.g., third party data aggregators, search entities, social networks, and/or profile databases). The online analytics entity 102 may store the information about the publisher's content and/or online inventory in one or more analytics databases 108 or other storage mediums. The one or more analytics databases 108 may store associations between various analytics (e.g., ratings, rankings, reviews, and/or other metrics and statistics) and one or more identifiers for the publisher's content and/or online inventory.

Examples of information about the publisher's content and/or online inventory that may be provided by an online analytics entity 102 may include, but are not limited to, a percentage of the total possible consumers that consumed a publisher's content (i.e., "reach"), frequency of requests per consumer to a publisher's content, average content requests to a publisher's content per day, total content requests to a publisher's content over a given period (e.g., a week, a month, etc.), average time spent by a consumer interacting with a publisher's content, ranking of a publisher's content against other publishers' content in a same or similar content category based on a measure of consumer requests (e.g., total content requests over a given period), demographic information related to consumers of a publisher's content, ranking of a publisher's content against other publishers' content with regard to traffic from consumers within one or more demographic segments, indication of amount of requests to a publisher's content attributable to non-human traffic, inventory clutter indices that provide information about the amount of inventory associated with a given piece of content, income indices, information about a propensity of consumers of the publisher's content to engage in certain activities (e.g., c-commerce), geographic visitor concentrations, and/or information about the viewability of inventory within the publisher's content.

Publisher 104 stores and provides content to consumers. For example, the publisher 104 may store and provide to consumers webpages, videos, audio, games, and/or any other online content. The online content may be associated with online inventory (e.g., advertisement opportunities, online presence management opportunities, promotion opportunities, etc.). The online content stored and provided by the publisher 104 may be associated with one or more means for obtaining the online content, including, for example, one or more Internet addresses associated with one or more domains or sub-domains owned and/or operated by the publisher 104.

The third party 106 may be any of a party involved in the sale of online inventory, an audience member, another publisher, a search engine, and/or any party interested in analytics regarding a publisher's content and/or online inventory. For example, as described above, a third party 106 involved in the sale of online inventory may be interested in using analytics regarding a publisher's content and/or online inventory to facilitate the efficient sale of online inventory (e.g., in pricing of online inventory, promotion, etc.). Additionally or alternatively, a third party 106 may be interested in verifying the identity of a publisher, a publisher's content, and/or a publisher's online inventory.

As will be described in greater detail with regard to FIG. 2, the online analytics entity 102 is configured to generate secure tokens associated with publishers' content and/or online inventory. These secure tokens provide a protected method for a publisher 104 to identify its content and/or online inventory to a third party 106 and for the third party 106 to obtain trusted information from the online analytics entity 102. In some implementations, a secure token may take the form of a string of characters (e.g., ASCII characters) that may be sent between publishers 104 and third parties 106. Additionally or alternatively, in some implementations, the secure token may be a data structure that may include, for example, identifying information and one or more security features.

To obtain a secure token, a publisher 104 may send a request 120 for a secure token to an online analytics entity 102. The request 120 may include identification information of individual content and/or online inventory (e.g., an individual webpage, video, or advertising opportunity) or a group of content and/or online inventory (e.g., all content associated with a means for accessing a group of content, such as a domain or sub-domain). For example, the request 120 may include a uniform resource locator (URL) associated with the content with regard to which one or more online advertising opportunities are available (e.g., space for a display advertisement on a webpage), a title of a game in which a promotional opportunity is available, or an identifier of an account on a social media platform with regard to which a branding opportunity is available.

The online analytics entity 102 receives the request 120 and matches the information included in the request 120 with analytics data or other information included in the one or more analytics databases 108 via interface 122. Based on the information included in the request 120 and/or the matched information included in the one or more analytics databases 108, the online analytics entity 102 may create a secure token, as will be described in greater detail below with regard to FIG. 2. The online analytics entity 102 may respond to the request 120 with a response 124 that includes the secure token.

The publisher 104 may then provide the secure token to one or more third parties 106 in one or more communications 126. For example, the publisher 104 may provide the secure token as part of a response to a request from a third party 106 or as part of a request sent from the publisher 104 to the third party 106. In some implementations, for example, the publisher 104 may provide a secure token to a third party 106 involved in the sale of the publisher's online inventory. In some implementations, the publisher 104 may provide the secure token as part of a query string within a URL. Additionally or alternatively, the publisher 104 may provide the secure token as part of an HTTP POST request, as site-defined HTTP request variables, and/or within HTTP cookie values. However, the publisher 104 may rely upon any suitable method of providing the secure token to a third party 106.

A third party 106 may use a secure token to procure information about the content and/or online inventory associated with the secure token. In some implementations, for example, the third party 106 may send the secure token in a communication 130 to a profile database 110. The profile database 110 may be any type of computer system and/or computer storage medium capable of providing information associated with a secure token in response to receipt of the secure token. For example, the profile database 130 may store one or more mappings between secure tokens and information about the content and/or online inventory associated with the secure token. In some implementations, for example, the profile database 130 may be configured to store one or more profiles including analytics or other relevant information associated with content and/or online inventory. For example, a profile may include various types of ratings and/or rankings of the content and/or online inventory associated with the profile's secure token (e.g., the ranking of the content and/or online inventory within one or more categories and/or demographic breaks associated with the content and/or online inventory). In some implementations, the online analytics entity 102 may provide a mechanism by which a publisher 104 may control the amount and/or type of information included in each profile associated with its content and/or online inventory.

Examples of analytics or other relevant information associated with content and/or online inventory that may be included in a profile may include, but are not limited to, a percentage of the total possible consumers that consumed a publisher's content (i.e., "reach"), frequency of requests per consumer to a publisher's content, average content requests to a publisher's content per day, total content requests to a publisher's content over a given period (e.g., a week, a month, etc.), average time spent by a consumer interacting with a publisher's content, ranking of a publisher's content against other publishers' content in a same or similar content category based on a measure of consumer requests (e.g., total content requests over a given period), demographic information related to consumers of a publisher's content, ranking of a publisher's content against other publishers' content with regard to traffic from consumers within one or more demographic segments, indication of amount of requests to a publisher's content attributable to non-human traffic, inventory clutter indices that provide information about the amount of inventory associated with a given piece of content, income indices, information about a propensity of consumers of the publisher's content to engage in certain activities (e.g., e-commerce), geographic visitor concentrations, information about the viewability of inventory within the publisher's content, and/or indication of brand safety for a publisher's content (e.g., whether the content may be adult-related and therefore inappropriate for certain buyers' brands).

The one or more profile databases 110 may be maintained at any appropriate and convenient location and by any appropriate and relevant party. For example, in some implementations, the profile database 110 may be maintained by an online analytics entity 102 (e.g., either the online analytics entity that produced the secure token or another online analytics entity). In these implementations, the online analytics entity 102 may, for example, host one or more servers that store the profile database 110 and may provide an application program interface (API) through which third parties may query the profile database 110 for information about publisher's online inventory and/or content. In some implementations, one or more of the profile databases 110 may be included in or otherwise maintained in relation to the one or more analytics databases 108. Additionally or alternatively, one or more of the profile databases 110 may be provided to or otherwise maintained by one or more publishers 104, while the information stored in these one or more of the profile databases 110 may be provided and secured by an online analytics entity 102.

For example, an online analytics entity 102 may provide a profile database 110 to a publisher 104 that is a "black box" computer system that includes one or more security features that prevents the publisher 104 from tampering with the information stored in the profile database 110. In some implementations, for example, the "black box" computer system may be a preconfigured server designed to be integrated into the network of a publisher 104, but that does not include an interface for the publisher 104 and encrypts stored data to prevent tampering. Alternatively, in some implementations, online analytics entity 102 may provide one or more sets of secured computer instructions (e.g., protected executable files) that are designed to retrieve and store profile-related information in a secure fashion (e.g., through the use of one or more types of encryption and/or validation). The online analytics entity 102 may periodically or aperiodcially send to such a "black box" profile database 110 analytics and/or other information relevant to the content and/or online inventory associated with the publisher 104 maintaining the "black box" profile database 110. In some implementations, the analytics and/or other information may be updated on a daily and monthly basis and consist of one or more primary handoffs. Updates to the analytics and/or other information may be made available through a digital distribution channel (e.g., as FTP or a yum repository).

In implementations where the profile database 110 is stored remotely from an entity that requests analytics and/or other information associated with a secure token, the speed with which the profile database 110 may be capable of responding to requests for the analytics and/or other information may not be fast enough to be made part of an "in the bid" request (i.e., the analytics and/or other information associated with a secure token may not be able to be provided in real time with a bid for online content associated with the secure token). Accordingly, where the profile database 110 is stored remotely from an entity that requests analytics and/or other information associated with a secure token, the entity may be instructed or otherwise configured to request and store (e.g., in cache) analytics and/or other information associated with one or more secure tokens, such that the information may be used during the bidding process. In these implementations, the entity may be further instructed or otherwise configured to request and store the analytics and/or other information associated with the one or more secure tokens on a set schedule (e.g., no fewer than once a day) in order to ensure the use of fresh, reliable data.

In response to the communication 130, the profile database 110 may be configured to provide information associated with the secure token as part of a communication 132 to third party 106. The third party 106 may use the information related to content and/or online inventory in any appropriate manner. For example, where a third party 106 is involved in a sale of online inventory related to the secure token, the third party 106 may use the information received with communication 132 from the profile database 110 to more efficiently price and/or promote the online inventory being sold. In some implementations, the online analytics entity 102, a publisher 104, a third party 106, analytics database 108, and a profile database 110 may be configured to execute or otherwise handle the various requests, responses, and communications 120, 124, 126, 130, and 132 within a short enough period of time as to be useful in real-time programmatic sales of online inventory. An example of such a programmatic sale involving a secure token will described with regard to FIG. 3.

Figure 2:
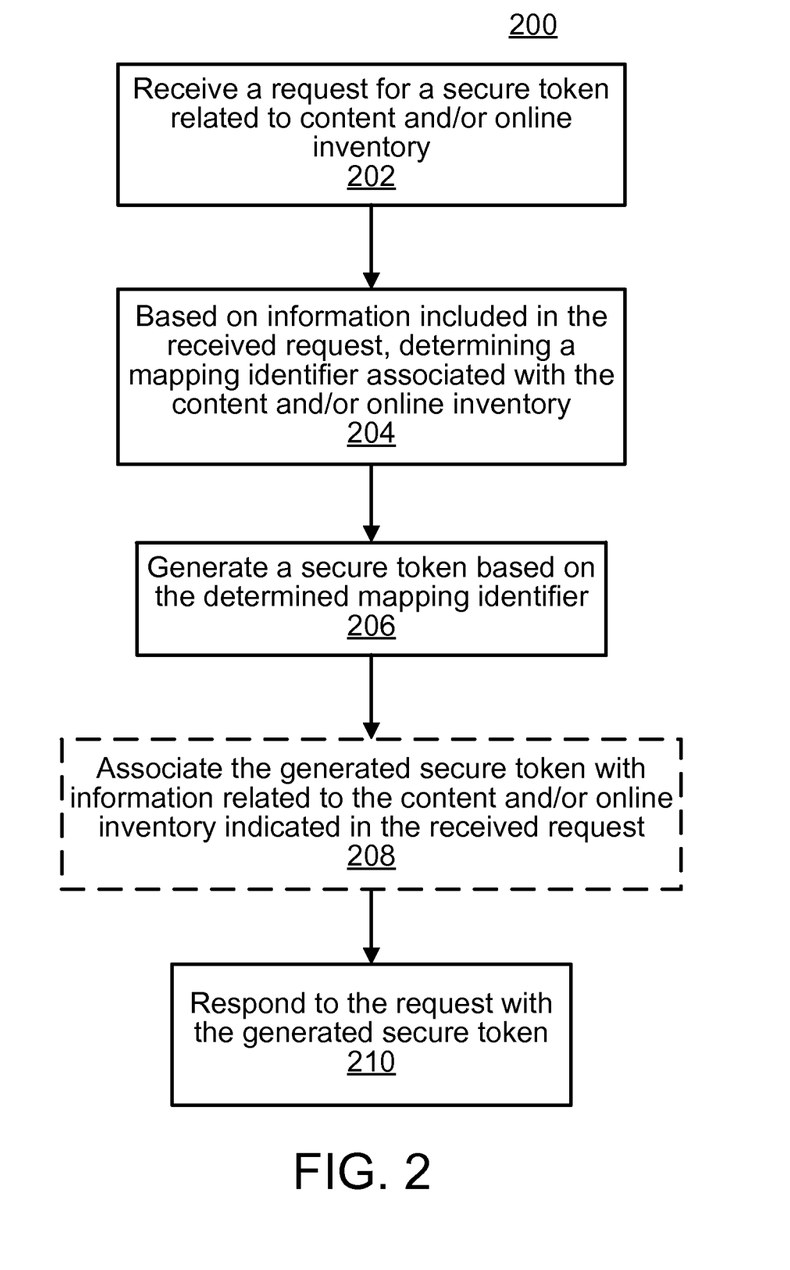
FIG. 2 is a flowchart of an example process for generating a secure token according to one implementation.

FIG. 2 is a flowchart of an example of a process 200 for generating a secure token according to one implementation. For case of explanation, process 200 will be described with regard to the elements of FIG. 1. However, any computer system may implement the operations described with regard to process 200. Though the operations of process 200 will be described in a certain order, the operations may be performed in any logical order. Moreover, the process 200 may include more or fewer operations than will be described with regard to FIG. 2.

At 202, an online analytics entity 102 receives a request for a secure token related to a publisher's content and/or online inventory. The request may be received via any suitable communication medium, including, for example, the Internet, a cellular network, or other wired or wireless electronic network. The received request may include an identifier related to the content and/or online inventory (e.g., a URL associated with the content and/or online inventory). In some implementations, the received request may also include other information related to the content and/or online inventory (e.g., information about the type of online inventory, information about the placement of the online inventory within related content, etc.). For example, other information related to the content and/or online inventory may be information about a user of a client device from which a request for a publisher's content originates (e.g., "segments" to which the publisher learns the user belongs, for example, via tracking the user's online activity via a cookie stored on the user's client device by the publisher). In some implementations, this other information related to the content and/or online inventory may be displayed with the profile about the content and/or online inventory returned by the profile database 110, though the other information may be clearly delineated from the information provided and certified by the online analytics entity.

At 204, the online analytics entity 102 may then determine (or generate) a mapping key associated with the content and/or online inventory based on the information included in the received request. In some implementations, for example, the online analytics entity 102 and/or the analytics database 108 may store information associated with the content and/or online inventory (e.g., audience measurement data, categorical data, descriptive data, etc.) in association with some form of a mapping key. For example, the online analytics entity 102 may maintain a dictionary of publishers' content that relates one or more URLs to a mapping key that is, in turn, related to information about the publisher and the content available at the URL (e.g., one or more categories with which the content may be associated). A content dictionary can take any form that associates an identifier associated with one or more publishers' content (e.g., a mapping key) and information about the publisher and the content. For example, in some implementations, the content dictionary may be database that stores relationships between identifier associated with publishers' content (e.g., a mapping key) and information about the publisher and the content.

In some implementations, the mapping key may be the same as or a portion of the identification information included in the received request. For example, the online analytics entity 102 may be configured to analyze the identification information included in the received request based on a set of business rules that dictate what portions of the identification information included in the received request the online analytics entity 102 should use in creating the mapping key. Where the identification information included in the received request is a URL, for example, the online analytics entity 102 may be configured to use a set of business rules to determine what portions of the URL on which to determine a mapping key. Thus, if the URL included in the received request is "www.sports.news.com/current_scores.html," the online analytics entity 102 may be configured to use a set of business rules to determine that the mapping key is or is based on "sports.news.com" or "news.com." In some implementations, operation 204 may not be a separate operation (e.g., where there is no mapping key other than the URL or a portion thereof), and the process 200 would continue directly from operation 202 to operation 206.

If, at 204, the online analytics entity 102 determines that the publisher's content and/or online inventory indicated in the request received at 202 is not part of a secure token program and/or the online analytics entity 102 otherwise does not store information about the content/inventory, the online analytics entity 102 may return an error in response to the request. Additionally or alternatively, the online analytics entity 102 may include in its response an offer to gather and/or develop the information necessary to implement a secure token for the content/inventory.

At 206, the online analytics entity 102 generates a secure token based on the determined mapping key and/or the identification of the publisher's content and/or online inventory included in the request. In some implementations, to generate the secured token, the online analytics entity 102 may be configured to add various security features to the determined mapping key. For example, the online analytics entity 102 may be configured to encrypt the determined mapping key, alone and/or with other information, using one or more encryption algorithms. The other information that may be combined with the mapping key as part of creating the secure token may include, for example, information about a client system requesting the publisher's content, the publisher, or another third party involved in the transaction (e.g., an IP address of the client system and/or information about a DSP or SSP involved in the transaction for the online inventory), a timestamp, a secret code, and/or data about a user of the client system (e.g., information known to and provided by the publisher).

In implementations where other information is included with the mapping key to generate the secure token, the other information may include information that may be used by the profile database 110 to verify the source of the secure token. For example, the secure token may be generated using the IP address of the client system requesting a publisher's content. When the client makes a request to a DSP or SSP that includes the secure token, the DSP or SSP that receives the request will have access to the IP address from which the request was sent. In a request to the profile database 110 for information associated with the secure token, the DSP or SSP may include the IP address of the client system. The profile database 110 may be configured to extract the IP address included in the secure token and compare it against the IP address provided by the DSP or SSP. If the IP addresses match, the profile database 110 will be able to determine that the client system that made the original request to a publisher that led to the creation of the secure token is the same client system now making a request to the SSP or DSP. Such a comparison prevents third parties from appropriating the secure token and passing is off with their own content. Other information may be used in place of a client system's IP address to similar effect.

The one or more encryption algorithms used to generate the secure token may be either one-way or two-way. In some implementations, the one or more encryption algorithms are two-way, so that the online analytics entity 102 and/or profile database 110 may later decrypt the mapping key to access information associated with the publisher's content and/or online inventory via the secure token.

In some implementations, the online analytics entity 102 may be configured to change on a periodic or aperiodic basis various inputs of the one or more encryption algorithms or the encryption algorithms themselves in order to further enhance the security features of the secure token. For example, keys to the one or more encryption algorithms may be changed daily, hourly, or after every received request to make the secure tokens more resistant to hacking and replication. Moreover, in some implementations, when a publisher discovers that a secure token has been compromised, the online analytics entity 102 may provide the publisher with a mechanism for requesting a new secure token.

In some implementations, at 208, the online analytics entity 102 may be configured to store the generated secure token in association with the mapping key from which it was generated and/or the associated information related to the content and/or online inventory in the analytics database 108 and/or the profile database 110. By storing the generated secure token in this manner, the analytics database 108 and/or profile database 110 may be configured to quickly search for stored information using the secure token in response to a request including the secure token. However, in some implementations, storing the generated secure token in this manner is not necessarily required, as the online analytics entity 102, the analytics database 108 and/or the profile database 110 may be configured to remove one or more of the security features of a secure token in order to recover the mapping key in order to search for stored information.

At 210, the online analytics entity 102 responds to the received request with the generated secure token. In some implementations, the response from the online analytics entity 102 may also include additional information related to the content and/or online inventory identified in the received request.

Figure 3:
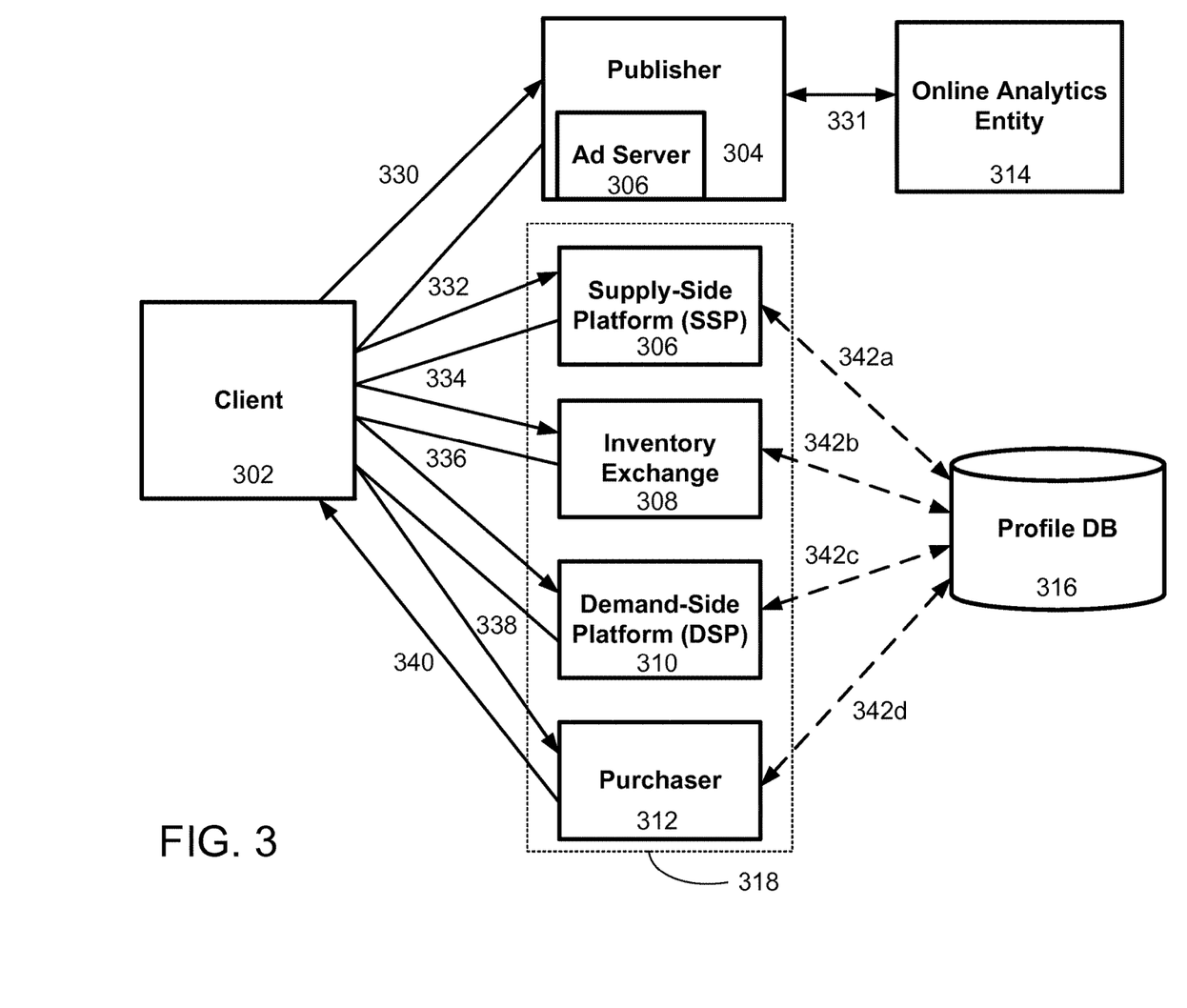
FIG. 3 is a block diagram illustrating an example system for programmatic sales of online inventory according to one implementation.

FIG. 3 is a block diagram illustrating an example of a system 300 for programmatic sales of online inventory according to one implementation. Though, for ease of explanation, the system 300 will be described with a particular number of elements performing certain operations, the system 300 may include more, fewer, or different elements and the described operations may be performed by other elements.

In some implementations of a programmatic transaction system 300, when a client system 302 sends a request 330 for content (e.g., a webpage, a video, a game, a streaming service, etc.) to a publisher 304, the publisher's ad server 306 recognizes that online inventory associated with the requested content (e.g., space for a display advertisement on a webpage) needs to be filled. In some instances, the publisher's ad server 306 may be able to directly fill the online inventory based on previous sales (e.g., sales of expected online inventory via direct sales channels). However, where publisher's ad server 306 is not able to directly fill inventory associated with a client system's request for content, the publisher's ad server 306 may be configured to utilize programmatic sales channels to sell the inventory. Thus, in real time with the request 330, the ad server 306 may be configured to take steps to sell the online inventory through programmatic sales channel 318. A programmatic sales channel may include various components, including, for example, one or more supply-side platforms (SSP) 306, one or more inventory exchanges 308, and one or more demand-side platforms (DSP) 310.

A SSP 306 provides an interface between a publisher and one or more inventory exchanges 308, though in some implementations publishers may directly interface with the one or more inventory exchanges 308. In some implementations, a SSP 306 may include one more computer systems that may be configured to manage a portion or the entirety of the online inventory across a number of a publisher's properties. An inventory exchange 308 acts as an auction house for online inventory. In some implementations, an inventory exchange 308 may include one more computer systems that may be configured to provide a platform by which publishers' online inventory may be sold at a price determined, at least in part, by the known characteristics of the online inventory, the supply of similar online inventory, and the demand for online inventory with the known characteristics.

Purchasers of online inventory 308 may interface directly with an inventory exchange 308 or may utilize a DSP 310 or other intermediary to interface with the inventory exchange 308. A DSP 310 provides an interface between a purchaser of online inventory and one or more inventory exchanges 308. In some implementations, DSP 310 may include one more computer systems that may be configured to manage a portion or the entirety of one or more online campaigns of an online inventory purchaser. As described above, there may be more, fewer, or different parties involved in a programmatic sales channel 318, and the features and operations described herein will be equally applicable and useful to any such parties.

Like any type of sales channel, the effectiveness of a programmatic sales channel depends on whether a trusted standard can be established for valuing the products on sale. As with any product for sale, the product's characteristics, as well as the products supply and demand, contribute to this valuation. However, as described above, publishers may want to control the type and amount of information about the origin of the online inventory when selling the inventory through a programmatic sales channel. Unfortunately, without a method of controlling the release of information about a publisher's online inventory that is also trusted by purchasers of online inventory, the programmatic sales channel may encounter inefficiencies in valuing the online inventory. For example, publishers may be willing to release little to no information about their online inventory and/or purchasers of online inventory may unable or unwilling to trust information about online inventory that is not attributable to a given publisher.

Though in some instances parties within the programmatic sales channel (e.g., SSPs, exchanges, and/or DSPs) may be able to certify the source of the information (i.e., the publisher) without disclosing the publisher's identity, these parties may not be able to certify the accuracy of the information being provided by the publisher. Moreover, purchasers of online inventory may be unwilling to trust information from parties directly involved in the sale of the online inventory. Accordingly, it is desirable to provide methods and systems that satisfy all parties related to the programmatic sales channel by providing publishers control over the amount and type of information that is distributed about their content and/or online inventory and simultaneously provide third parties (e.g., SSPs, exchanges, DSPs, and/or purchasers) with assurance that accurate information about the content and/or online inventory is coming from a trusted source.

Beyond knowing the source of the information, all parties relying upon the information want assurances that the information being provided is accurate, which can be challenging. One challenge to the accuracy of analytics related to content and online inventory is non-human traffic (NHT). In today's world of digital media, content flows seamlessly across the digital landscape-bouncing from server to server, exposing it to multitudes of parties and/or audiences. Publishers invest heavily in making sure their media is continuously being "shared," "linked," and "fanned" so that it may reach and attract new audiences that can be monetized. However, not all traffic that accesses a publisher's content is authentic human traffic. Computer software specifically designed to mimic human behavior online—commonly known as bots—may inflate the number of media impressions associated with digital content. For instance, some computer software can generate browsing activity from users' computers without the users' intent and without being seen by the users. Other software can create pop-ups, pop-unders, and/or browser hijacks that redirect users' client systems to content other than the content the user intended to visit. Whether or not publishers are responsible for this unauthentic traffic, accurate analytics regarding content and/or online inventory must account for and reflect the unauthentic traffic in order to enhance trustworthiness.

Similarly, domain laundering, or the act of obscuring a publisher's domain in an attempt to profit by selling low-value placements at high prices, is another possible threat to accurate information about a publisher's content and/or online inventory. Identifying domain laundering is a challenge for several reasons. First, security policies of modern browsers often restrict the information accessible to tag-based javascript, which is commonly used to provide telemetry. Similarly, crawling-based methods may miss specific instances of domain laundering and offer no direct information about the volume of traffic drawn to a site. Additionally, not all domain obfuscation counts as laundering. For example, a publisher's domain might be obscured during the course of serving an ad for legitimate reasons (e.g., an ad network using third parties for inventory). Finally, detection typically requires tracing a series of HTTP redirects, which may contain obfuscation or even deception. A holistic view is required to reconstruct the full trace of an ad call.

Accounting for NHT and domain laundering is beneficial to establishing a trustworthy source of information about publishers' content and/or online inventory. Without such accounting, high value domains can have their brand value reduced through dilution, since buyers may be less likely to trust a sale of inventory involving a brand known to be a regular target of fraud. It is therefore highly desirable to provide an independent, unbiased, and trusted measurement standard for validating and scoring online inventory and to provide the mechanisms necessary to leverage this information in various real-time or near-real-time environments (e.g., programmatic sales channels).

Accordingly, a trusted online analytics entity 314 can rely upon the above-described methods and system for generating and exchanging secure tokens to facilitate a more efficient valuation of online inventory within a programmatic sales channel. In some implementations, for example, when a publisher 304 receives a request for content from a client system 302 and identifies (via ad server 306 or otherwise) the need to sell online inventory associated with the requested content, the publisher 304 and/or ad server 306 may initiate or cause the initiation of communication with programmatic sales channel 318 to sell the available online inventory. To initiate this communication, the publisher 304 and/or ad server 306 may, for example, insert a mechanism within the publisher's content (e.g., a piece of code, such as JavaScript) that, when executed or otherwise used by the client system 302, causes or permits the client system 302 to request purchaser content (e.g., an advertisement, promotional or brand management material, etc.) via the programmatic sales channel 318 to fill online inventory associated with the requested content.

In some implementations, when the publisher (e.g., via its content and/or ad servers) sends one or more replies 332 to the client system 302 including the requested content and the mechanism, the mechanism within the replies 332 causes or permits the client system 302 to contact an SSP 306 before, during, or after the client system 302 presents the received content to a user of the client system 332. For example, where the content is a webpage, the mechanism inserted into the content may cause a browser on the client system 302 rendering the content to create a first iframe within the rendered webpage at the location of the online inventory. The mechanism inserted into the content may provide for communications with the SSP 306 through this first iframe.

In causing or permitting communication with the SSP 306, the mechanism inserted into the content may cause or permit the client system 302 to provide information about the available online inventory and/or the content associated with the online inventory to the SSP 306. In responding to the communication from the client system 302 regarding the available online inventory, the SSP 306 may select an appropriate inventory exchange 308 on which to sell the online inventory and provide a response 334 that includes an appropriate mechanism by which to contact the selected inventory exchange 308. For example, in some implementations, the response 334 from the SSP 306 may cause the client system 302 to create a second iframe within the first iframe through which to communicate with the selected inventory exchange 308 or the response from the SSP 306 may simply redirect the client system 302 to the selected inventory exchange 308. In some implementations, the response 334 may include a URL of the selected inventory exchange 308, and the URL may include information (e.g., via query strings) necessary or desirable for the inventory exchange 308 to facilitate the sale of the online inventory.

In responding to the communication from the client system 302 regarding the available online inventory, the inventory exchange 308 may sell the online inventory to a purchaser 312 via a particular DSP 310 and provide a response 336 that includes an appropriate mechanism by which to contact the DSP 310. For example, in some implementations, the response 336 from the inventory exchange 308 may cause the client system 302 to create a third iframe within the second iframe through which to communicate with the DSP 310 or the response from the inventory exchange 308 may simply redirect the client system 302 to the DSP 310. In some implementations, the response 336 may include a URL of the DSP 310, and the URL may include information (e.g., via query strings) necessary or desirable for the return of purchaser content to fill the sold online inventory.

In responding to the communication from the client system 302 regarding the sold online inventory, the DSP 310 may provide a response 338 that includes an appropriate mechanism by which to retrieve purchaser content to fill the sold online inventory from the purchaser 312 or a system associated with purchaser 312 that provides purchaser content on behalf of purchaser 312. For example, in some implementations, the response 338 from the DSP 310 may cause the client system 302 to create a fourth iframe within the third iframe in which to present the content provided by purchaser 312 or the response from the DSP 310 may simply redirect the client system 302 to the location of the purchaser's content. In some implementations, the response 336 may include a URL associated with the purchaser's content, and the URL may include information (e.g., via query strings) necessary or desirable for the purchaser 312 or a system associated with purchaser 312 to provide the appropriate content to fill the sold inventory. As a result, the purchaser 312 or a system associated with purchaser 312 provides such appropriate content in a communication 340.

Though the various communications 332, 334, 336, 338, and 340 involving the parties associated with the programmatic sales channel 318 are illustrated in FIG. 3 as occurring via the client system 302, one or more of the communications can be carried out directly between the parties associated with the programmatic sales channel 318. For example, in some implementations, the SSP 306 may communicate in real-time directly with the inventory exchange 308, the inventory exchange 308 may communicate in real-time directly with the DSP 310, and/or the DSP 310 may communicate in real-time directly with the purchaser 312.

As described above, any one of the parties associated with the programmatic sales channel 318 may benefit from trustworthy information regarding the online inventory being sold. Accordingly, the online analytics entity 314 may provide for the dissemination of such information via the exchange of a secured token in or related to the various communications 332, 334, 336, 338, and/or 340. In some implementations, for example, the online analytics entity 314 may provide the publisher 304 (or any other entity within the sales channel, e.g., the SSP 306 or DSP 310) with a creation API (e.g., via a set of code) that defines an interface between the publisher 304 (or other entity) and the online analytics entity 314 for requesting a secure token. In some implementations, for example, when a publisher 304 receives a request for content from client system 302, the publisher 304 (via its content server and/or ad server) may utilize the creation API provided by the online analytics entity 314 to provide the information (i.e., inputs) necessary to create a secure token to the online analytics entity 314. The creation API may be flexible with regard to the number and type of inputs the publisher 304 may provide. For example, for a given content request from client system 302, the publisher 304 may utilize the creation API to provide the online analytics entity 314 with an identification of the content being requested (e.g., a URL), the IP address of the client system 302 making the request, and information about online inventory associated with the content (e.g., type, size, and/or placement). In response to the request from the publisher 304, the online analytics entity 314 may utilize a process like the one described above with regard to FIG. 2 to generate and return a secure token using the information provided via the API.

Additionally, the online analytics entity 314 may provide any party within the sales channel 318 (e.g., the SSP 306, inventory exchange 308, and/or DSP 310) with a query API between a querying party and a profile database 316 that allows the querying party to query the profile database 316 with a secure token to obtain trusted information about the content and/or online inventory associated with the secure token that is endorsed or guaranteed by the online analytics entity 314. In some implementations, for example, the query API may define the information a querying party must provide to the profile database 316 to obtain the trusted information (e.g., the secure token, information about the system from which the querying party received the secure token, and/or information about the transaction involving the online inventory associated with the secure token). Additionally or alternatively, in some implementations, the query API may define the amount and type of trusted information that will be provided in response to the query involving a secure token, as well as the format in which the trusted information will be returned.

In some implementations, for example, when a client system 302 requests content from publisher 304, ad server 306 (or any other system associated with the publisher) determines the need to sell online inventory associated with the requested content via programmatic sales channel 318. As a result of this determination, the ad server 306 (or other system associated with the publisher) may send a request 331 to the online analytics entity 314 for a secure token associated with the requested content and/or the online inventory being sold. As part of this request 331, the publisher 204 may provide an identifier (e.g., a URL) associated with the requested content to the online analytics entity 314, as well as any other relevant information associated with the requested content and/or the online inventory being sold (e.g., information about the placement of the online inventory which the requested content, such as size, shape, and/or location). As described above with regard to FIG. 2, the online analytics entity 314 generates a secure token for the requested content and/or the online inventory being sold and returns it to the ad server 306.

The publisher (e.g., via its content and/or ad server) may include the secure token in the mechanism inserted into the requested content for contacting the SSP 306. For example, in implementations where the secure token is a string of characters, the secure token may be included in the URLs (e.g., via query strings) communicated by the parties associated with the programmatic sales channel in communications 332, 334, 336, and/or 338. For example, the publisher may insert into the requested content a URL for an SSP 306 to be used in the programmatic sale of the online inventory, and the URL may be supplemented with the secure token, such that the SSP 306 receives the secure token when the client system sends a request to the URL (e.g., "http://programmatic.bestSSP.com/?token=1H8s98Vb&placement=top_center&type=banner" where "1H8s98Vb" is the secure token). The SSP may then return a URL for an inventory exchange 308 that is supplemented with the secure token, such that the inventory exchange 308 receives the secure token when the client system sends a request to the URL (e.g., "http://programmatic.bestExchange.com/?token=1H8s98Vb&sspID=123ABC&trascationType=blind&placement=top_center&type=banner" where "1H8s98Vb" is the secure token). The secure token may then be passed to any other entity within the programmatic sales channel via a similar inclusion in the URLs requested by the client system 302 and/or other entities. Additionally or alternatively, the secure token and other information related to the online inventory may be passed in other mechanisms related to requests made by the client 302 or other entities within the programmatic sales channel (e.g., http request variables).

In some implementations, a SSP 306 may be configured to directly communicate the secure token to the profile database 316 via, for example, the previously described querying API (though any acceptable means of communication may be utilized). In response to a communication 342a from a SSP 306, the profile database 316 provides the information associated with the requested content and/or the online inventory being sold. The profile database 316 may optionally provide thepublisher 304 with a mechanism to select the type of information to be provided in a returned profile, though the publisher 304 has no control over the information itself. Each of inventory exchange 308, DSP 310, and/or purchaser 312 may similarly receive a secure token and query the profile database 316 about the secure token via communications 342b, 342c, and 342d, respectively.

In some implementations, the publisher 304 may, on its own or in partnership with the online analytics entity 314, provide a request API as part of the mechanism the publisher 304 inserts into its requested content by which a requesting party associated with the programmatic sales channel 318 may attempt to request a secure token for online inventory being sold, even though one or more other parties have failed to provide the requesting party with the secure token. For example, in the above described implementation in which the secure token is passed between parties using the various URLs communicated to the client system 302, if a party associated with the programmatic sales channel 318 does not receive a secure token as part a URL because the secure token was dropped by a previous party within the chain of communications, the request API provided by the publisher 304 may provide a mechanism by which each party associated with the programmatic sales channel 318 may attempt to request a secure token (e.g., from the client system 302).

For example, the mechanism inserted by the publisher 304 into the content may utilize specialized cross domain mechanisms (e.g., SafeFrame) that permit limited communication with the host frame (e.g., the frame the publisher 304 caused to be created) which may have access to the secure token. In certain instances, iframes may block the content requested through the iframe from interacting with the parent frame or window in which the iframe exists. In this way, iframes provide publishers a secure mechanism to allow third parties to display content in the same frame or window as the publisher's content while preventing the third party from gaining information about the publisher or its content or any control over the publisher's frame or window. However, it may be desirable to allow the third party access to certain functions and/or information held by the parent frame or window. Cross domain mechanisms (e.g., SafeFrames) provide publishers with a mechanism for allowing third parties controlled access to functions and/or information held by the parent frame or window. Thus, for example, when a party within the standard delivery chain of a secure token does not receive a secure token, the party may use the cross-domain mechanism of the request API to access the publisher's secure token.

Though it has been previously described that the publisher 304 requests the secure token, the publisher 304 may instead rely upon another party within the programmatic sales channel (e.g., a SSP) to request a secure token and control the amount and type of information distributed about the publisher, the content, and/or the online inventory. For example, in some implementations, publisher 304 may be configured to simply permit a SSP 306 access to a URL associated with the online inventory. In these implementation, the API provided by the online analytics entity 314 may permit the SSP 306 to use the URL associated with the online inventory to request a secure token (using the process described previously for publisher requests for secure tokens). The SSP 306 may then pass the received token to one or more of the other parties associated with the programmatic sales channel. Similarly, the publisher 304 (via the API or otherwise) may provide any one or more parties associated with the programmatic sales channel with the ability to request a secure token associated with online inventory from the online analytics entity 314.

The online analytics entity 314 may collect compensation from any party within the programmatic sales channel for provision of a secure token and/or a profile associated with a secure token. For example, in some implementations, the DSP 310 may be periodically invoiced for the total volume of inventory transactions that leverage a secure token. The DSP 310 may in turn add that cost into its transaction costs with the buying parties. Additionally or alternatively, the publisher 304 may be invoiced on a subscription or per-use basis for the availability of secure token for its inventory and/or for one or more types of metrics included in profiles associated with the publisher's inventory. For example, a certain baseline set of metrics/analytics may be available in each profile, but other metrics/analytics (e.g., an NHT score) may require additional compensation.

Though the foregoing description of FIG. 3 focused on a programmatic sales channel, the systems and methods described for requesting and exchanging secure tokens and information associated with secure tokens are equally applicable to any other parties, systems, and/or entities that may benefit from the use of such secure tokens. For example, the systems and methods described related to secure tokens may be utilized by computer systems involved in any type of online transaction that may benefit from the controlled distribution of trusted information.

Figure 4:
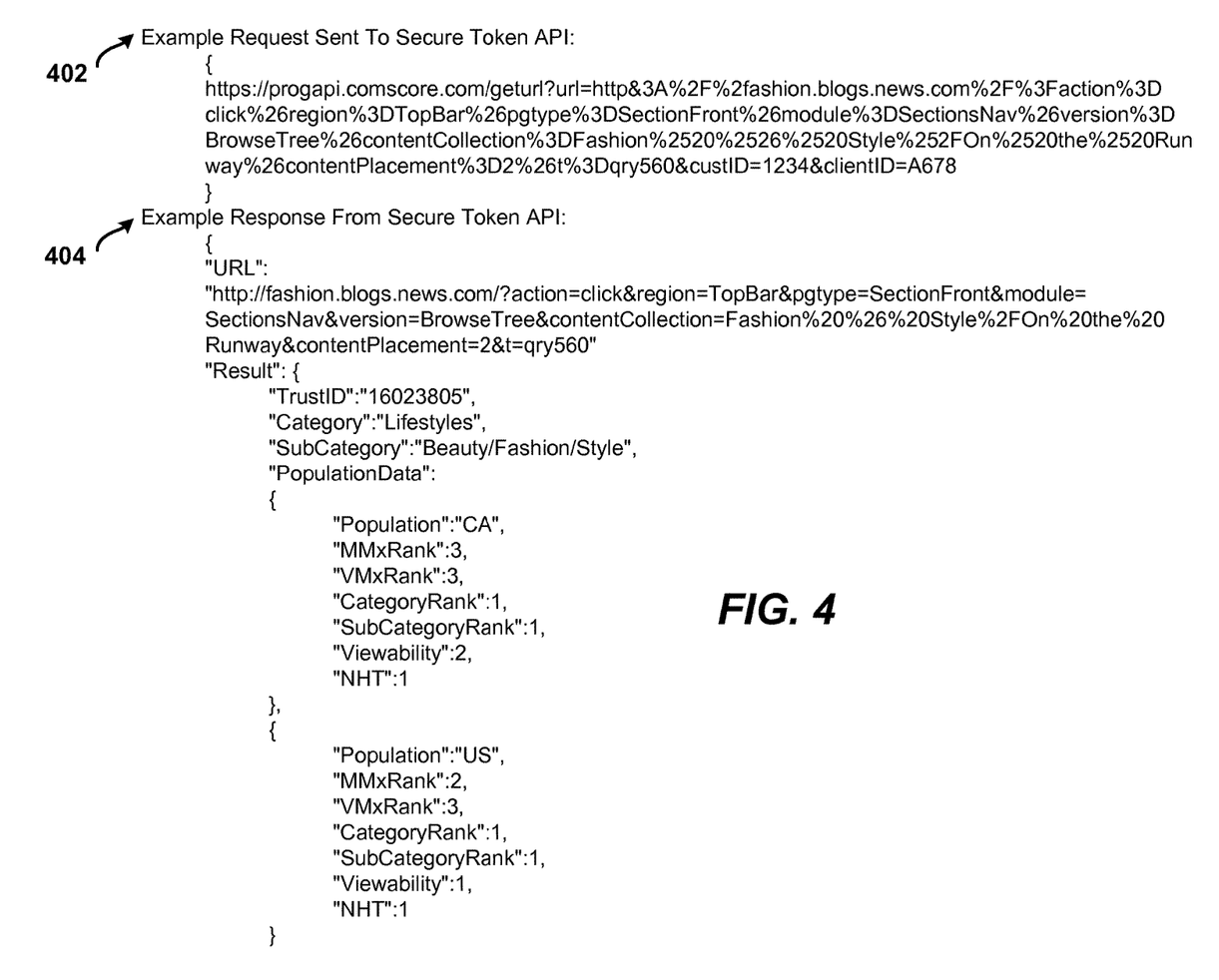
FIG. 4 is an example interaction with an application program interface (API) for exchanging a secure token according to one implementation.

FIG. 4 is an example interaction with an application program interface (API) for exchanging a secure token according to one implementation. Any party involved in the sale of online inventory may generate request 402 and cause request 402 to be sent to either or both of an online analytics entity or an profile database. In particular, the request 402 includes the URL associated with the online inventory (i.e., "http://fashion.blogs.news.com . . . &t=qry560"), a customer ID associated with the request 402 (i.e., "123"), and a client ID associated with the request 402 (i.e., "A678"). The response 404 from the online analytics entity and/or the profile database includes the secure token associated with the URL (i.e., "16023805"), as well as information related to the secure token, which will be described below. As described previously, the party responsible for request 402 may use the information related to the secure token included in response 404 to more efficiently facilitate the sale of the online inventory. Additionally or alternatively, the party responsible for request 402 may communicate the secure token and/or the information related to the secure token to other parties related to the sale of the online inventory.

There is various information related to the secure token that may be included in the response 404, and the publisher may have full control over the amount and type of information provided. In the example shown in FIG. 4, the information related to the secure token includes the category and subcategory of the publisher's content to which the online inventory is related. In this case, the publisher's content is a fashion blog, so the category is "Lifestyles" and the subcategory is "Beauty/Fashion/Style." The information related to the secure token also includes two sets of audience metrics for the publisher's content, one for each of two populations of audience members. The first set of audience metrics pertains to audience members who live in Canada and the second set of audience metrics pertains to audience members who live anywhere in the United States. The audience metrics for each population include, for example, the ranking of the publisher's content based on access requests as compared to all content requested on mobile devices (i.e., MMxRank), the ranking of the publisher's content according to audience member's engaged time spent viewing the content as compared to all other available video content (i.e., VMxRank), the ranking of the publisher's content based on access requests as compared to all content classified in the same category and subcategory, a viewability score that indicates the likelihood that an audience member will view the online inventory (which may take into account the placement of the online inventory within the publisher's content or simply average the likelihood of all possible placements), and a non-human traffic score that indicates the amount of traffic to a site that results from non-human traffic (e.g., bots). Each of these audience metrics may be exact numbers or may be abstracted. For example, the various rankings may either be the actual rank or may be a general grouping (e.g., top-10, top-100, top-1000, etc.).

In the example implementation shown in FIG. 4, the API provides for a single request 402 that results in a response 404 that includes both a secure token and information associated with the secure token, based on a URL associated with online inventory. However, in other implementations the API may provide one request mechanism for obtaining a secure token based on a URL (or other identifier of content and/or online inventory) and a separate request mechanism for obtaining information associated with the secure token. Thus, with regard to the example illustrated in FIG. 4, in some implementations, request 402 may result in a response that only includes the "TrustID" (i.e., secure token) portion of the "Result" in the response 404, whereas a separate request that includes the secure token will result in the return of the remainder of the "Result" portion of the response 404, which would be a profile for the inventory associated with the secure token.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:
1. A method, comprising:
receiving, by a first computer system and from a second computer system managed by a publisher, a first request to generate a secure token related to an online inventory of the publisher, the first request including a uniform resource locator (URL) for publisher content associated with the online inventory, wherein the online inventory comprises locations within the publisher content for displaying advertisements to consumers of the publisher content, wherein the first computer system is different than the publisher that manages the second computer system;

comparing at least a portion of the URL included in the first request with entries in a content dictionary;

determining, based on the comparison of at least the portion of the URL included in the first request with the content dictionary, a mapping key that associates the publisher content associated with the online inventory with categorization information about the publisher content;

determining, generating, by the first computer system, a category of the publisher content associated with the online inventory by obfuscating the determined mapping key; based at least in part on the URL included in the first request;

combining, by the first computer system, the determined category with (1) a timestamp, (2) a secret code, and (3) information about a user of a client system from which a third request for the publisher content associated with the online inventory has been received;

generating, by the first computer system, the secure token by using a key and a reversible encryption algorithm to encrypt the combination;

responding, by the first computer system, to the first request with the generated secure token;

receiving, by the first computer system and from a third computer system, a second request for rankings information for the publisher content associated with the online inventory, the second request including the generated secure token, wherein:

the third computer system is associated with a sale of the online inventory and is different from the first and second computer systems, and the rankings information comprises at least one ranking for the publisher content representing a comparison of activity data of the consumers of the publisher content and activity data of consumers of another publisher's content of the category of the publisher content;

forwarding, by the first computer system, and in response to the second request, the rankings information of the category of the publisher content; and causing, based on the rankings information of the category of the publisher content, display of the publisher content and an advertisement on the client system.

2. The method of claim 1, further comprising accessing one or more rules to determine which portion of the URL to include in the mapping key.

3. The method of claim 1, further comprising:
applying a decryption algorithm to the secure token included in the second request for information received from the third computer system in order to retrieve the category of the publisher content associated with the online inventory; and obtaining, using the retrieved category, the at least one ranking of the publisher content associated with the online inventory.

4. The method of claim 1, further comprising receiving, by the first computer system and from the publisher, an indication of an amount or a type of the information describing attributes associated with the publisher content with which the first computer system may respond to the first request, wherein responding, by the first computer system, to the first request with the information describing attributes associated with the publisher content comprises responding, by the first computer system, to the first request with one or more selectable options for the amount or the type of the information indicated by the publisher.

5. The method of claim 1, wherein the category of the publisher content associated with the online inventory comprises a portion of the URL included in the first request.

6. The method of claim 1, further comprising:
providing, via the first computer system, an application program interface (API) through which the third computer system queries a profile database of the first computer system.

7. A system, comprising:
a first computer system including a first set of one or more processors and a first set of one or more storage devices storing instructions that, when executed by the first set of one or more processors, cause the first set of one or more processors to:

send a first request to generate a secure token related to an online inventory of a publisher, the first request including a uniform resource locator (URL) for publisher content associated with the online inventory, wherein the online inventory comprises locations within the publisher content for displaying advertisements to consumers of the publisher content;

a second computer system including a second set of one or more processors and a second set of one or more storage devices storing instruction that, when executed by the second set of one or more processors, cause the second set of one or more processors to:

receive, from the first computer system, the first request to generate the secure token related to the online inventory;

compare at least a portion of the URL included in the first request with entries in a content dictionary;

determine, based on the comparison of at least the portion of the URL included in the first request with the content dictionary, a mapping key that associates the publisher content associated with the online inventory with categorization information about the publisher content;

determine generate a category of the publisher content associated with the online inventory by obfuscating the determined mapping key; based at least in part on the URL included in the first request;

combine the determined category with (1) a timestamp, (2) a secret code, and (3) information about a user of a client system from which a third request for the publisher content associated with the online inventory has been received;

generate the secure token by using a key and a reversible encryption algorithm to encrypt the combination; and respond to the first request with the generated secure token;

a third computer system including a third set of one or more processors and a third set of one or more storage devices storing instructions that, when executed by the third set of one or more processors, cause the third set of one or more processors to:

receive the generated secure token; and submit a second request for rankings information for the publisher content associated with the online inventory based on the generated secure token, wherein the third computer system is associated with a sale of the online inventory and is different from the first and second computer system;

a fourth computer system including a fourth set of one or more processors and a fourth set of one or more storage devices storing instructions that, when executed by the fourth set of one or more processors, cause the fourth set of one or more processors to:

receive, from the third computer system, the second request for rankings information for the publisher content associated with the online inventory based on the generated secure token, wherein the rankings information comprises at least one ranking for the publisher content representing a comparison of activity data of the consumers of the publisher content and activity data of consumers of another publisher's content associated with the online inventory;

search, based on the secure token received with the second request, for rankings information for the publisher content of the category of the publisher content; and forward, to the third computer system, the rankings information of the category of the publisher content, wherein the fourth computer system is different than the publisher that manages the second computer system; and a client computer system including a fifth set of one or more processors and a fifth set of one or more storage devices storing instructions that, when executed by the fifth set of one or more processors, cause the fifth set of one or more processors to display the publisher content and an advertisement based on the rankings information of the category of the publisher content.

8. The system of claim 7, wherein the second and fourth computer systems are the same computer system.

9. The system of claim 7, wherein the instructions stored by the third set of one or more storage devices that, when executed by the third set of one or more processors, cause the third set of one or more processors to receive the generated secure token comprise instructions that, when executed by the third set of one or more processors, cause the third set of one or more processors to receive, from the client system, a request that includes a request URL, the request URL including the generated secure token as part of a query string.

10. The system of claim 7, wherein the instructions stored by third set of one or more storage devices comprise instructions that, when executed by the third set of one or more processors, cause the third set of one or more processors to transmit instructions to the client system that cause the client system to request the generated secure token.

11. The system of claim 7, wherein the first computer system is a server of a content publisher, the second and fourth computer systems are one or more servers of an online analytics entity, and the third computer system is a server.

12. The system of claim 7, wherein the instructions stored by the second set of one or more storage devices that, when executed by the second set of one or more processors, cause the second set of one or more processors to access one or more rules to determine which portion of the URL to include in the mapping key.

13. The system of claim 7, wherein the instructions stored by the fourth set of one or more storage devices comprise instructions that, when executed by the fourth set of one or more processors, cause the fourth set of one or more processors to:

apply a decryption algorithm to the secure token included in the second request for information received from the third computer system in order to retrieve the category of the publisher content associated with the online inventory; and obtain, using the retrieved category, the at least one ranking of the publisher content associated with the online inventory.

14. The system of claim 7, wherein the instructions stored by the fourth set of one or more storage devices that, when executed by the fourth set of one or more processors, cause the fourth set of one or more processors to respond to the third computer system with the rankings information of the category of the publisher content comprise instructions that, when executed by the fourth set of one or more processors, cause the fourth set of one or more processors to respond to the third computer system with the combination.

15. The system of claim 7, wherein the instructions stored by fourth set of one or more storage devices comprise instructions that, when executed by the fourth set of one or more processors, cause the fourth set of one or more processors to receive, from the publisher, an indication of an amount or a type of the rankings information of the category of the publisher content with which the fourth computer system may respond to the second request, and wherein the instructions stored by fourth set of one or more storage devices that, when executed by the fourth set of one or more processors, cause the fourth set of one or more processors to respond to the third computer system with the rankings information of the category of the publisher content comprise instructions that, when executed by the fourth set of one or more processors, cause the fourth set of one or more processors to respond to the second request with one or more selectable options for the amount or the type of the information indicated by the publisher.

16. The system of claim 7, wherein the category of the publisher content associated with the online inventory comprises a portion of the URL included in the first request.

* * * * *